(12) United States Patent
Huang

(10) Patent No.: US 8,336,859 B2
(45) Date of Patent: Dec. 25, 2012

(54) APPARATUS FOR TENSIONING A STRAP

(76) Inventor: Han-Ching Huang, Xianxi Township, Changhua County (TW)

(*) Notice: Subject to any disclaimer, the term of this patent is extended or adjusted under 35 U.S.C. 154(b) by 452 days.

(21) Appl. No.: 12/773,762

(22) Filed: May 4, 2010

(65) Prior Publication Data
US 2011/0271500 A1   Nov. 10, 2011

(51) Int. Cl.
*B21F 9/00* (2006.01)
*B66F 3/00* (2006.01)
(52) U.S. Cl. ...... 254/218; 254/223; 24/69 ST; 24/71 ST
(58) Field of Classification Search .......... 254/218, 254/223; 24/69 ST, 71 ST
See application file for complete search history.

(56) References Cited

U.S. PATENT DOCUMENTS

| | | | | |
|---|---|---|---|---|
| 6,799,750 | B2 * | 10/2004 | Chen | 254/218 |
| 7,281,701 | B1 * | 10/2007 | Huang et al. | 254/218 |
| 7,836,560 | B2 * | 11/2010 | Huang | 24/68 CD |
| 7,909,306 | B2 * | 3/2011 | Adcock | 254/218 |

* cited by examiner

*Primary Examiner* — Emmanuel M Marcelo

(57) ABSTRACT

A strap-tensioning apparatus includes a frame, a handle connected to the frame, a reel supported on the frame, two ratchets secured to the reel, a first detent supported on the handle and biased to engage with the ratchets, and a second detent supported on the frame and biased to engage with the ratchets. The frame includes two walls each including a recess. The handle includes two walls each including a lobe. The first detent includes a chamfered tip. The ratchets can slide on the chamfered tip of the first detent to allow a strap to be reeled out when the chamfered tip of the first detent is in the recesses of the frame. The second detent is disengaged from the ratchets by the lobes of the handle when the chamfered tip of the first detent is in the recesses of the walls of the frame.

6 Claims, 5 Drawing Sheets

US 8,336,859 B2

APPARATUS FOR TENSIONING A STRAP

BACKGROUND OF INVENTION

1. Field of Invention

The present invention relates to an apparatus for tensioning a strap and, more particularly, to a strap-tensioning apparatus for providing clicks when a strap is reeled out.

2. Related Prior Art

As disclosed in U.S. Pat. No. 6,799,750, a conventional strap-tensioning apparatus includes a handle 12 pivotally connected to a frame 8 by two semi-axles 9. The frame 8 includes a floor extending between two walls each including a slot defined in a middle section, an aperture defined in a terminal section, and another aperture 6 defined in an opposite terminal section. A loosening recess 1, a releasing recess 3 and a locking recess 7 are defined in the edge of each of the walls of the handle 12. The semi-axles 9 are inserted in the apertures 6 of walls of the handle 12. Two ratchets 10 are located around the semi-axles 9 so that the ratchets 10 can be rotated together with the semi-axles 9. A spring-biased baffle is movably located in the slots of the walls of the handle 12. Another spring-biased baffle 11 is movably located in slots defined in walls of the handle 12. There are provided two sliding gears 4 each pivotally to a related one of the walls of the handle 12 by a pin 5.

The handle 12 can be pivoted to a first position relative to the frame 8 and the spring-biased baffle 11 can be located in the loosening recesses 1. A strap can freely be reeled from the semi-axles 9. However, the reeling out of the strap is not indicated.

The handle 12 can be pivoted to a second position relative to the frame 8 and the spring-biased baffle 11 can be located in the loosening recesses 1. By pivoting the handle 12 and using the sliding gears 4, the strap can be reeled from the semi-axles 9 by a pitch of the ratchets 10 at a time. A click is made when each of the sliding gears 4 hits one of the teeth of a related one of the ratchets 10. This is however troublesome because the strap can only be reeled from the semi-axles 9 by a pitch of the ratchets 10 at a time.

The present invention is therefore intended to obviate or at least alleviate the problems encountered in prior art.

SUMMARY OF INVENTION

It is the primary objective of the present invention to provide a strap-tensioning apparatus for providing clicks when a strap is reeled out.

To achieve the foregoing objective, the strap-tensioning apparatus includes a frame, a handle connected to the frame pivotally, a reel supported on the frame rotationally, two ratchets secured to the reel, a first detent movably supported on the handle and biased to engage with the ratchets, and a second detent movably supported on the frame and biased to engage with the ratchets. The frame includes two walls each including a recess defined in an edge. The handle includes two walls each including a lobe formed on an edge. The first detent includes a chamfered tip. The ratchets can slide on the chamfered tip of the first detent to allow a strap to be reeled out from the reel when the chamfered tip of the first detent is in the recesses of the walls of the frame. The second detent is disengaged from the ratchets by the lobes of the walls of the handle when the chamfered tip of the first detent is in the recesses of the walls of the frame.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
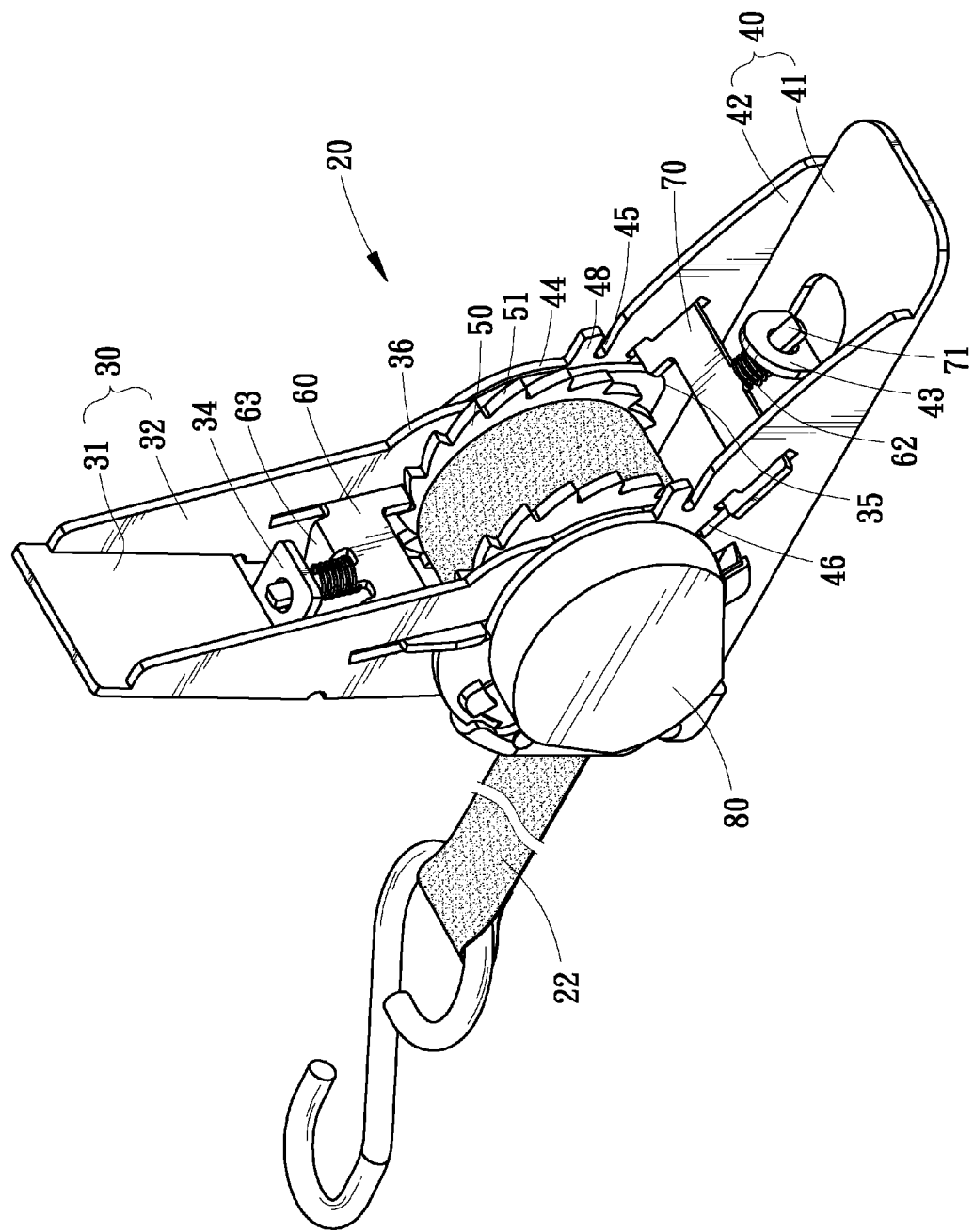
FIG. 1 is a perspective view of a strap-tensioning apparatus according to the preferred embodiment of the present invention.
Figure 3:
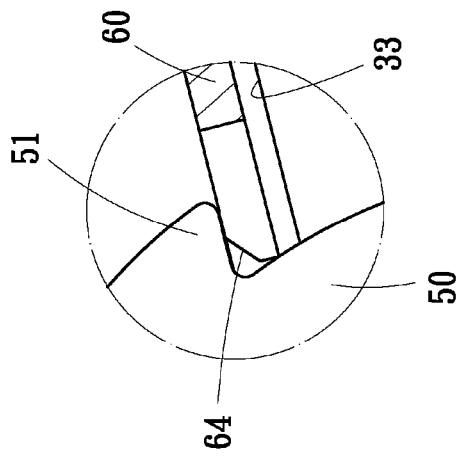
FIG. 3 is an enlarged partial view of the strap-tensioning shown in FIG. 2.
Figure 2:
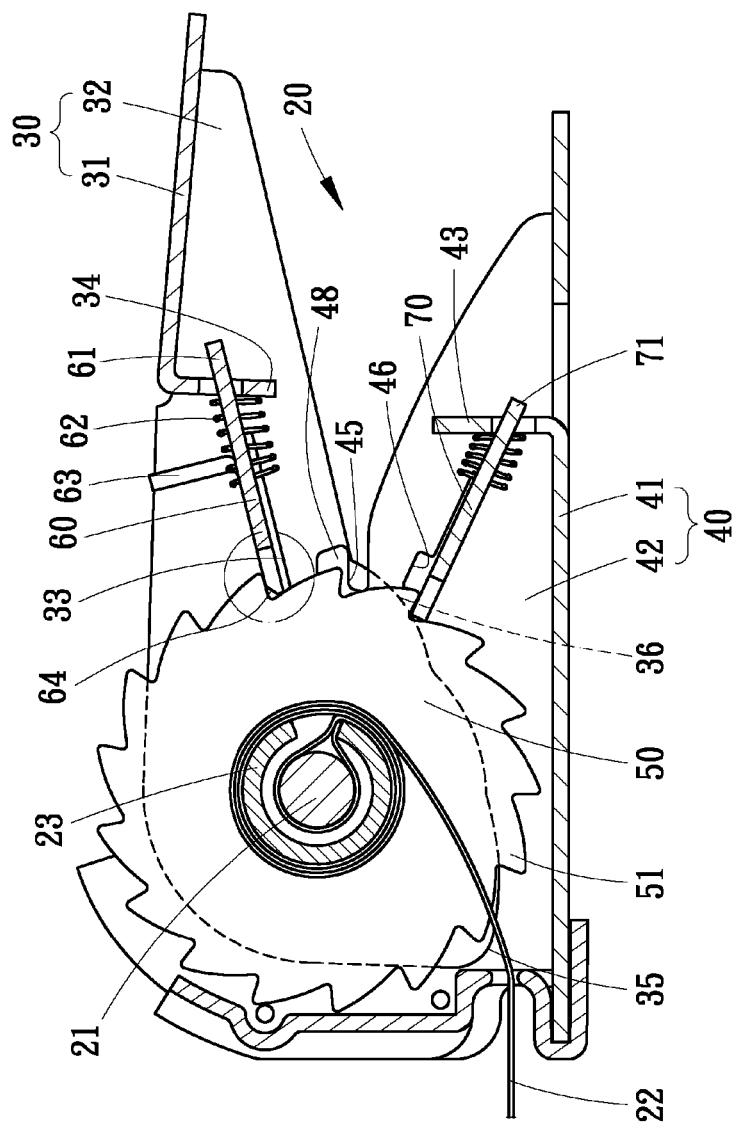
FIG. 2 is a cross-sectional view of the strap-tensioning apparatus shown in FIG. 1.

Referring to FIGS. 1 through 3, a strap-tensioning apparatus 20 includes a handle 30, a frame 40, two ratchets 50, two detents 60 and 70, and a reeling mechanism 80 according to the preferred embodiment of the present invention. The handle 30 includes a roof 31 extending between two walls 32 and a tab 34 extending from the roof 31. A slot 33 is defined in each of the walls 32. Each of the walls 32 includes a first lobe 35 and a second lobe 36 formed on the edge.

The frame 40 includes a floor 41 extending between two walls 42 and a tab 43 extending from the floor 41. Each of the walls 42 includes two recesses 44 and 45 defined in the edge. The recess 44 is separated from the recess 45 by an extensive portion 48. Each of the walls 42 further includes a slot 46 defined therein.

Each of the ratchets 50 is formed with teeth 51. Each of the teeth 51 is formed with a cliff and a slope 52.

The detent 60 includes two horns and a tail 61 extending opposite to the horns and a tab 63 extending from a side. Each of the horns of the detent 60 is formed with a chamfered tip 64. The detent 70 includes two horns and a tail 71 extending opposite to the horns and a tab extending from a side.

The handle 30 is pivotally connected to the frame 40 by an axle 21. A reel 23 is rotationally supported on the frame 40. The reel 23 includes a C-shaped profile when it is viewed in an axial direction. The axle 21 is axially inserted through the reel 23. An end of a strap 22 is tied to the axle 21. The strap 22 is wound around the reel 23.

The ratchets 50 are located around and secured to the reel 23. Thus, the ratchets 50 can be rotated together with the reel 23.

Each of the horns of the detent 60 is movably located in the slot 33 of a related one of the walls 32 of the handle 30. A first spring 62 is compressed between the tab 63 of the detent 60 and the tab 34 of the handle 30. Thus, the horns of the detent 60 tend to engage with the teeth 51 of the ratchets 50. The tail 61 of the detent 60 is inserted through the first spring 62 and an aperture defined in the tab 34 of the handle 30.

Each of the horns of the detent 70 is movably located in the slot 46 of a related one of the walls 42 of the frame 40. A second spring is compressed between the tab of the detent 70 and the tab 43 of the frame 40. Thus, the horns of the detent 70 tend to engage with the teeth 51 of the ratchets 50. The tail 71 of the detent 70 is inserted through the second spring and an aperture defined in the tab 43 of the frame 40.

The reeling mechanism 80 is connected to the reel 23 on one hand and connected to the frame 40 on the other hand. The reeling mechanism 80 can automatically rotate the reel 23 to reel in the strap 22.

To tension the strap 22, the horns of the detent 60 are movably located in the recesses 44 of the walls 42 of the frame 40. The handle 30 is pivoted on the frame 40 in a direction. The detent 60 is pivoted together with the handle 30. The horns of the detent 60 engage with the teeth 51 of the ratchets 50. The horns of the detent 70 rattle on the teeth 51 of the ratchets 50 on the other hand. Thus, the ratchets 50 are rotated. The reel 23 is rotated together with the ratchets 50. Hence, the strap 22 is reeled in.

Then, the handle 30 is pivoted on the frame 40 in an opposite direction. The horns of the detent 60 rattle on the teeth 51 of the ratchets 50. The horns of the detent 70 engage with the teeth 51 of the ratchets 50 on the other hand. Thus, the ratchets 50 are not rotated, and the reel 23 is not rotated either. Hence, the strap 22 is not reeled out.

The foregoing steps are repeated several times so that the strap 22 is loaded with a desired value of tension. After that, the handle 30 is pivoted to a position on the frame 40 where the horns of the detent 60 are located near the extensive portions 48 of the walls 42 of the frame 40. The strap 22 cannot be reeled out from the reel 23 because the teeth 51 of the ratchets 50 are engaged with the horns of the detent 60.

Figure 4:
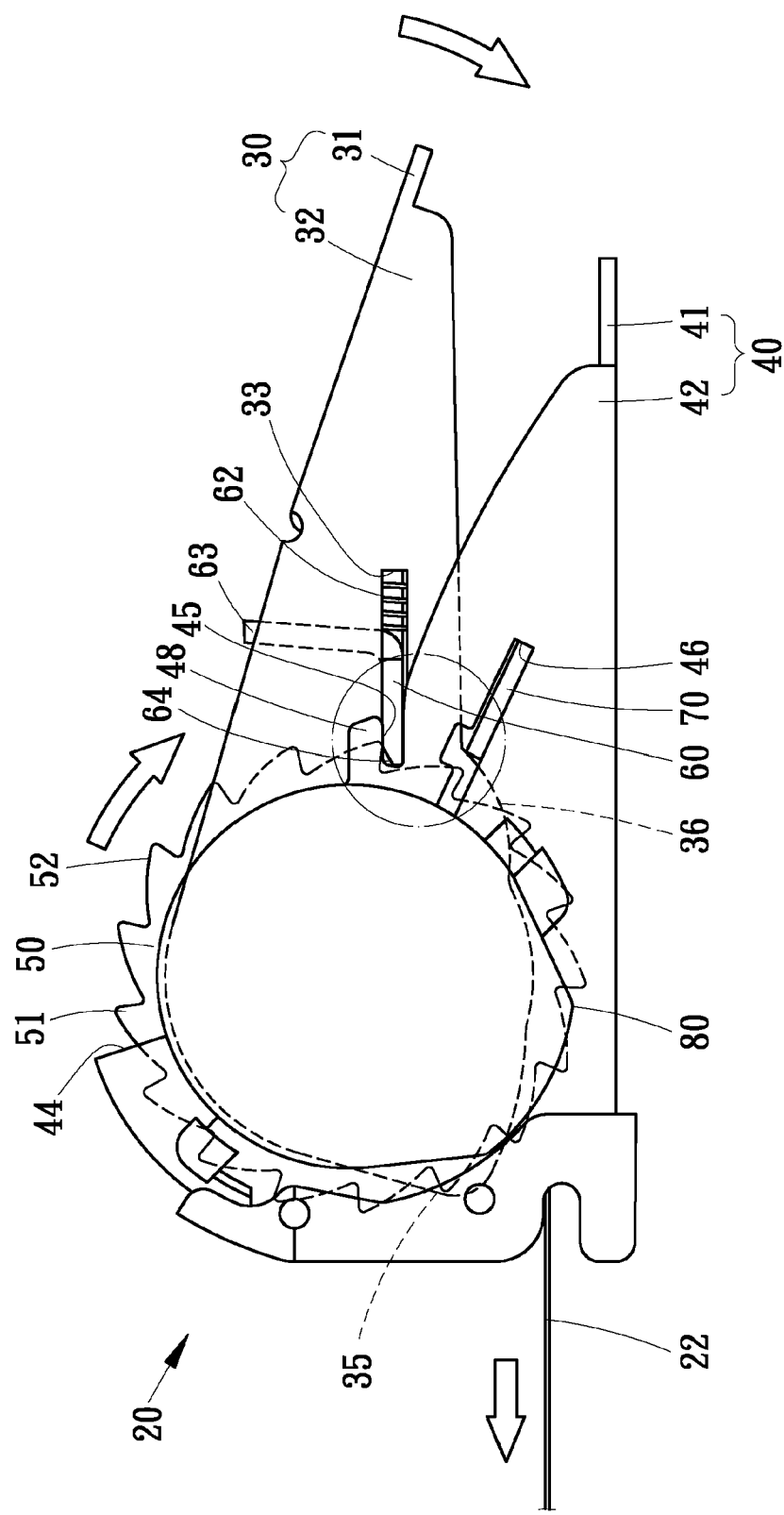
FIG. 4 is a cross-sectional view of the strap-tensioning apparatus in another position than shown in FIG. 2.
Figure 6:
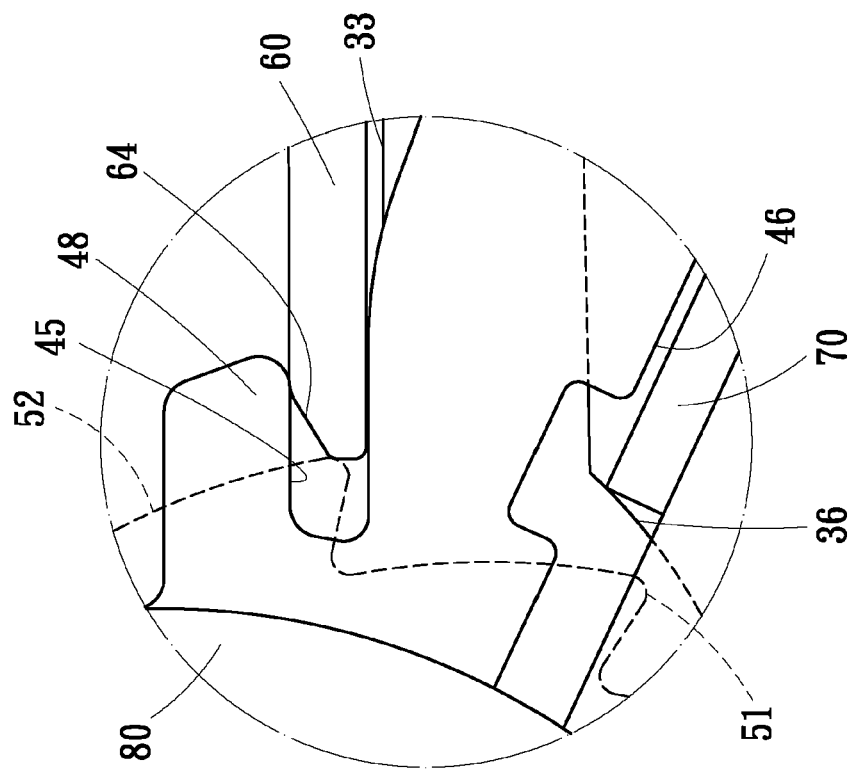
FIG. 6 is an enlarged partial view of the strap-tensioning apparatus in another position than shown in FIG. 5.
Figure 5:
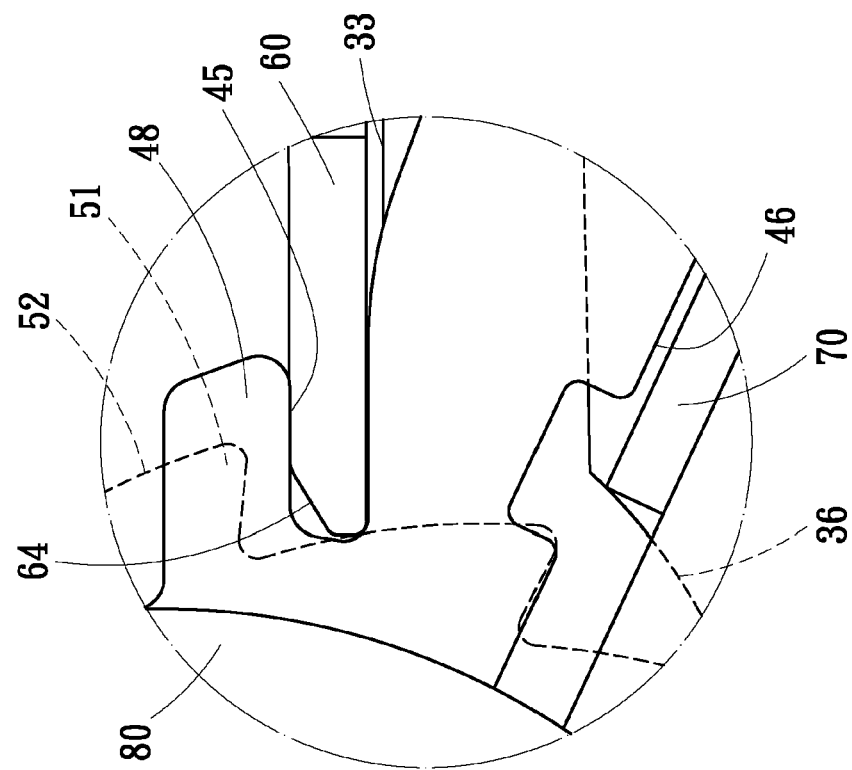
FIG. 5 is an enlarged partial view of the strap-tensioning apparatus shown in FIG. 4.

Referring to FIGS. 4 through 6, by operating the tab 63 of the detent 60, the horns of the detent 60 are disengaged from the teeth 51 of the ratchets 50. By pivoting the handle 30, the horns of the detent 60 are moved past the extensive portions 48 of the walls 42 of the frame 40. Then, the detent 60 and the handle 30 are released. The horns of the detent 60 are moved into the recesses 45 of the frame 40 because of the first spring 62. The horns of the detent 60 are not deep in the valleys between the teeth 51 of the ratchets 50 as shown in FIG. 5. The lobes 36 of the walls 32 of the handle 30 keep the horns of the detent 70 away from the teeth 51 of the ratchets 50. The strap 22 is reeled out as the slopes 52 of the teeth 51 of the ratchets 50 slide on the chambered tips 64 of the horns of the detent 60 as shown in FIG. 6. Clicks are made to indicate the reeling out as the teeth 51 of the ratchets 50 hit the horns of the detent 60.

Figure 7:
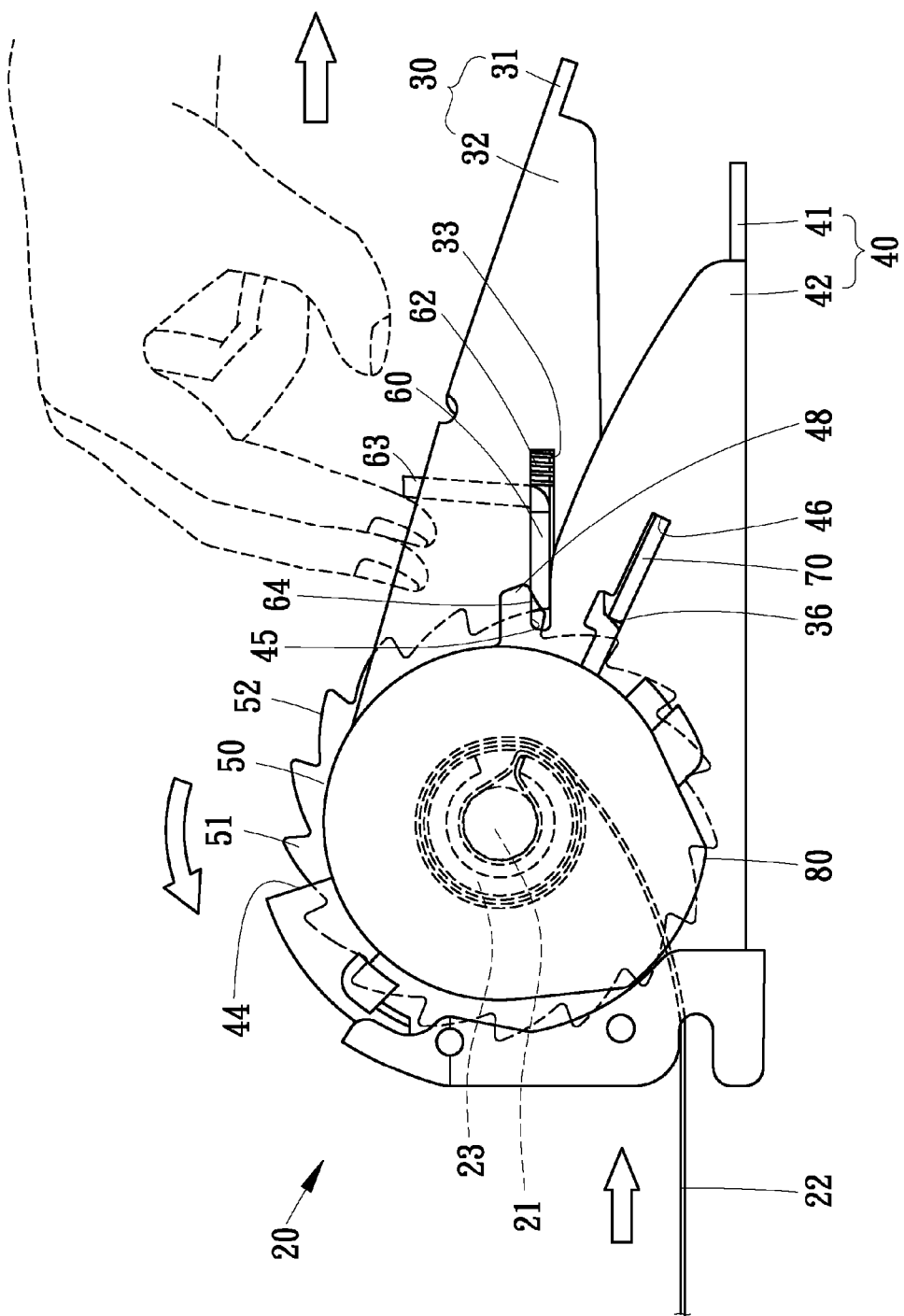
FIG. 7 is a cross-sectional view of the strap-tensioning apparatus in another position than shown in FIG. 4.

Referring to FIG. 7, by operating the tab 63 of the detent 60, the horns of the detent 60 are disengaged from the teeth 51 of the ratchets 50. With the reeling mechanism 80, the reel 23 is rotated, and the strap 22 is reeled in.

In another embodiment, the axle 21 and the reel 23 are replaced with two semi-axles as those disclosed in the U.S. Pat. No. 6,799,750. An end of the strap 22 is inserted through a gap between semi-axles. The strap 22 is wound around the semi-axles.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A strap-tensioning apparatus including:
    a frame including two walls each including a recess defined in an edge;
    a handle including two walls each including a lobe formed on an edge, wherein the handle is pivotally connected to the frame;
    a reel rotationally supported on the frame;
    two ratchets connected to the reel so that the ratchets can be rotated together with the reel;
    a first detent including a chamfered tip formed thereon, wherein the first detent is movably supported on the handle and biased to engage with the ratchets, the ratchets can slide on the chamfered tip of the first detent when the chamfered tip of the first detent is movably located in the recesses of the walls of the frame; and
    a second detent movably supported on the frame and biased to engage with the ratchets, wherein the second detent is disengaged from the ratchets by the lobes of the walls of the handle to allow a strap to be reeled out from the reel when the chamfered tip of the first detent is movably located in the recesses of the walls of the frame.

2. The strap-tensioning apparatus according to claim 1 further including a reeling mechanism connected to the frame on one hand and connected to the reel on the other hand so that the reeling mechanism can automatically reel the strap onto the reel.

3. The strap-tensioning apparatus according to claim 1, wherein the reel includes a C-shaped profile when it is viewed in an axial direction.

4. The strap-tensioning apparatus according to claim 1, further including an axle for pivotally connecting the handle to the frame, wherein an end of the strap is tied to the axle.

5. The strap-tensioning apparatus according to claim 4, wherein the reel includes a C-shaped profile when it is viewed in an axial direction, wherein the axle is inserted through the reel axially.

6. The strap-tensioning apparatus according to claim 1, wherein the reel includes two semi-axles, wherein an end of the strap is inserted through a gap between semi-axles.

* * * * *